Patented Feb. 28, 1928.

1,661,100

UNITED STATES PATENT OFFICE.

GEORGE S. TILLEY, OF BERKELEY, CALIFORNIA.

MANUFACTURE OF ALUMINUM CHLORIDE.

No Drawing. Application filed July 10, 1924. Serial No. 725,275.

The present invention relates to the production of aluminum chloride from aluminum sulfate or from alunite, or from other materials containing aluminum sulfate. The invention embraces the step of heating a mixture of dehydrated aluminum sulfate or material containing dehydrated aluminum sulfate, and a reducing agent, such as charcoal or coal or hydrogen gas, or sulphur chloride, in proportion sufficient to reduce the aluminum sulfate present into sulfide, and passing hydrochloric acid gas over the material so heated, the aluminum chloride thereupon being volatilized, and being subsequently collected from the issuing vapor and gases.

Assuming that aluminum sulfate is to be used as the starting material, that material is first dehydrated, and ordinarily I find it advisable to heat same for some hours at a temperature not over 130° C., during which period a portion of the water is driven off, without the particles of aluminum sulfate melting in the water of crystallization. Heat is then either rapidly or gradually increased, up to about 525° C., for instance (corresponding to an incipient red heat). This heat is continued until the dehydration is complete. If alunite is being used, this material can be directly heated up to about 525° C., for dehydrating the same, as it does not melt in its water of crystallization or other water present, even if strongly heated in the first instance.

To the heated material, after dehydration, in the manner above described, or in any other suitable manner, I either add a reducing agent, such as powdered coal or charcoal or treat the aluminum sulfate with a gaseous reducing agent such as hydrogen gas or sulphur chloride vapor introduced with the hydro-chloric acid gas. These materials are preferably used in proportions such as to produce substantially aluminum sulfide. The aluminum sulfate is heated to a temperature of about 500° C., in the presence of a reducing agent, as above described and dry or substantially dry hydrochloric acid gas is passed through the retort or muffle in which the same is being heated, and aluminum chloride is formed and volatilized, and is subsequently condensed and there collected from the gases and vapors issuing from the retort. The reduction of the aluminum sulfate to sulfide occurs at about a red heat, say a temperature of about 500° C. The gases and vapors leaving the muffle or retort are passed into a cooling chamber in which they are cooled, whereby aluminum chloride is deposited as a dry solid on the walls of the cooling chamber, while hydrogen sulfide and the excess of hydrochloric acid gas passes off uncondensed, and the hydrochloric acid gas can be recovered by a washing process, and can be returned to the process, or used for any desired purpose. Hydrogen sulfide can then be collected or worked up into any commercial product, say sodium sulphide, by methods well known in the art.

While I have above referred to a preferred temperature for the reaction

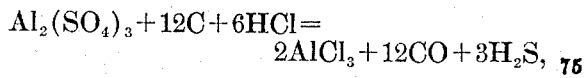

it will be understood that higher or lower temperatures can be used, say between about 350° and 550° C.

I claim:—

1. A process of making aluminum chloride which comprises subjecting aluminum sulfate material at a high temperature not substantially above 550° C., to the action of hydrochloric acid gas and a reducing agent.

2. A process of making aluminum chloride which comprises subjecting dehydrated aluminum sulfate and a reducing agent at a temperature between about 350° C. and 550° C., to the action of hydrochloric acid gas.

3. In the process of making aluminum chloride, the step which comprises subjecting aluminum sulfate material and a reducing agent to heat at a temperature substantially above the temperature of vaporization of aluminum chloride, and subjecting the said material to treatment with hydrochloric acid gas at a temperature not substantially above 550° C., but high enough to vaporize aluminum chloride.

4. A process which comprises dehydrating material containing aluminum sulfate, subjecting the same at a red heat to the action of a current of hydrochloric acid gas, in the presence of a reducing agent.

5. A process that includes dehydrating aluminum sulphate, then subjecting said dehydrated sulphate to the action of a reducing agent and hydrochloric acid at about 350 to 550° C., to form anhydrous aluminum chloride.

6. A process that includes dehydrating aluminum sulphate, and thereafter heating the same together with a solid reducing agent, and passing hydrochloric acid gas in contact with such mixture at about 500° C., to form anhydrous aluminum chloride and sulphur compounds, and then separating the chloride from the sulphur by fractional condensation.

In testimony whereof I affix my signature.

GEORGE S. TILLEY.